United States Patent [19]
Takayanagi et al.

[11] Patent Number: 4,810,433
[45] Date of Patent: Mar. 7, 1989

[54] PROCESS FOR PRODUCING ORIENTED FILM

[75] Inventors: Takashi Takayanagi; Hideo Kawaguchi, both of Shizuoka, Japan

[73] Assignee: Fuji Photo Film Co., Ltd., Kanagawa, Japan

[21] Appl. No.: 911,039

[22] Filed: Sep. 24, 1986

[30] Foreign Application Priority Data

Sep. 25, 1985 [JP] Japan ................... 60-211486
Sep. 26, 1985 [JP] Japan ................... 60-213198

[51] Int. Cl.⁴ ............................. B29C 35/08
[52] U.S. Cl. ............................. 264/22; 264/1.3; 264/1.4; 264/24; 264/78; 264/108; 526/320; 526/326
[58] Field of Search ............ 264/22, 1.3, 1.4, 2.1, 264/24, 78, 108, 104, 1.1; 430/77; 526/320, 326

[56] References Cited

U.S. PATENT DOCUMENTS

| | | | |
|---|---|---|---|
| 2,346,784 | 4/1944 | Pollack | 264/2.1 |
| 2,887,601 | 5/1959 | Bain | 264/108 |
| 3,459,839 | 8/1969 | Hutfles | 264/78 |
| 3,927,461 | 12/1975 | Peiperl | 264/1.3 |
| 3,968,309 | 7/1976 | Matsuo et al. | 264/1.4 |
| 4,140,369 | 2/1979 | Howland | 264/24 |
| 4,405,733 | 9/1983 | Williams et al. | 264/24 |
| 4,412,059 | 10/1983 | Krigbaum et al. | 264/290.2 |

FOREIGN PATENT DOCUMENTS 3312487 10/1984 Fed. Rep. of Germany ........ 264/27

Primary Examiner—Jeffery Thurlow
Attorney, Agent, or Firm—Sughrue, Mion, Zinn, Macpeak, and Seas

[57] ABSTRACT

A process for producing a highly uniaxially oriented film is disclosed, comprising supporting a composition comprising two or more liquid crystal monomers displaying a nematic or smectic state and having a polymerizable functional group in the molecule thereof and a photopolymerization initiator on or between a support or supports having been subjected to orientation, and irradiating said composition with radiation while maintaining said composition in a liquid crystal state to cause polymerization of said composition. The resulting film is free from pinholes, strain or unevenness and is excellent in optical transparency.

8 Claims, No Drawings

PROCESS FOR PRODUCING ORIENTED FILM

FIELD OF THE INVENTION

This invention relates to a process for producing uniaxially oriented films having a high degree of orientation. Highly uniaxially oriented films exhibit high mechanical strength in the orientation direction and are useful not only as wrapping films or corsslaminated films taking advantage of their strength but also as phase contrast films or polarizing films dyed with dichromatic dyes taking advantage of their optical anisotropy between the orientation direction and the direction perpendicular thereto, and, in addition, as optical filters, optical switching elements, recording materials, display materials, and the like.

BACKGROUND OF THE INVENTION

Highly uniaxially oriented films have generally been produced by uniaxially stretching a melt extrusion film or solution cast film at a temperature of from the glass transition temperature to the melting point, or by uniaxially stretching in a solvent capable of swelling the film to an appropriate degree. The uniaxially oriented films obtained by these orientation processes are liable to suffer from pinholes or strain from the nature of the production steps. In order to relieve the strain, heat treatment is sometimes performed. However, heat treatment is not always sufficient for relieving the strain, or impairs the flatness of the films, or causes optical nonuniformity or crystallization only to make the film turbid white.

Japanese patent application (OPI) No. 102205/83 (the term "OPI" as used herein refers to a "published unexamined Japanese patent application") discloses a process for producing polarizing films, in which a monomer having liquid crystal properties and the formula:

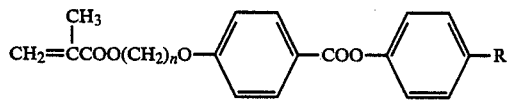

wherein R represents, for example

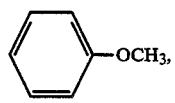

etc., is interposed between Nesa glass plates having been subjected to a rubbing treatment, and high voltage is applied to the glass cell to cause orientation and polymerization of the monomer.

However, this process has many problems such as: expensive Nesa glass should be used; application of high voltage is required; the temperature region in which the monomer shows a liquid crystal state is high; unevenness due to shrinkage is generated upon polymerization; and the like. Further, in cases when the above-described monomer is thermally polymerized in the presence of a polymerization initiator, such as AIBN (azobisisobutyronitrile), it is difficult to control the polymerization initiating temperature. Furthermore, in order to achieve rapid polymerization and also in view of bulk polymerization, orientation and polymerization should be carried out at a high temperature, usually above 100° C., making the production step very troublesome. Measures for solving these problems include photopolymerization. According to the photopolymerization process, polymerization can be effected at a temperature freely selected from the range of from room temperature to about 100° C. Therefore, monomers displaying a liquid crystal state (hereinafter referred to as liquid crystal monomers) at a relatively low temperature can be used, thus markedly simplifying the film production step.

Nevertheless, photopolymerization requires addition of a photopolymerization initiator, which, in some case, may result in another problem in that the liquid crystal region of the liquid crystal monomer becomes narrow depending upon the kind of photopolymerization initiator used, resulting in a failure to obtain a stable orientation state.

SUMMARY OF THE INVENTION

Accordingly, an object of this invention is to provide a process for producing a highly uniaxially oriented film which is free from pinholes, strain or unevenness due to polymerization shrinkage and is excellent in optical transparency.

Another object of this invention is to provide a process for producing a highly uniaxially oriented film having a stable orientation state without narrowing the liquid crystal region of a liquid crystal monomer.

As a result of extensive investigations, it has now been found that a film uniaxially oriented to a high degree which is free from pinholes, strain or unevenness and excellent in optical transparency can be obtained by supporting a composition comprising two or more liquid crystal monomers displaying a nematic or smectic state and having a polymerizable functional group in the molecule thereof and a photopolymerization initiator on or between a support or supports having been subjected to orientation, and irradiating said composition with radiation while maintaining said composition in a liquid crystal state. It has further been found that a photopolymerization initiator having at last one ethylenic linkage and at least one aromatic ring or heterocyclic aromatic ring in the molecule thereof effectively serves in the above-described process without narrowing the liquid crystal region of the liquid crystal monomers.

DETAILED DESCRIPTION OF THE INVENTION

The liquid crystal monomers which can be used in the present invention preferably include acrylate or methacrylate monomers represented by the formula (I):

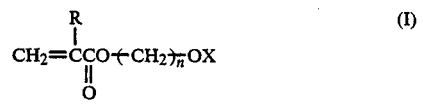

wherein R represents a hydrogen atom or a methyl group; n represents an integer of from 1 to 8 and 11; and X represents a para-substituted aromatic ring or a para-substituted heterocyclic ring.

In the above-described formula (I), the para-substituted aromatic or heterocyclic ring as represented by X specifically includes, but is not limited to, the following structures:

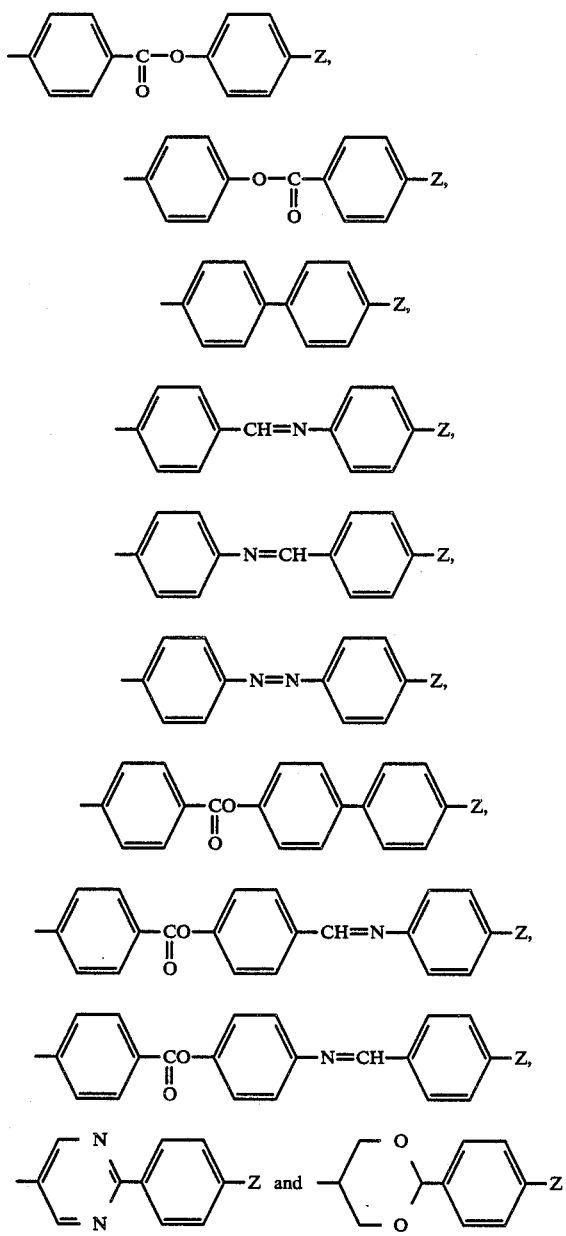

wherein Z represents, for example, a hydrogen atom, a cyano group, a fluorine atom, a chlorine atom, a bromine atom, a methoxy group, an ethoxy group, a propoxy group, a butoxy group, a pentyloxy group, a hexyloxy group, a heptyloxy group, an amino group, a nitro group, —NHQ, —NQ$_2$, etc., wherein Q represents a lower alkyl group having not more than 7 carbon atoms, e.g., a methyl group, an ethyl group, etc.

In the present invention, these liquid crystal monomers are used in combination of two or more thereof. It is preferable that the monomers to be combined together be selected so that a difference of the value n in the formula (I) ($\Delta n$) between each pair of monomers may not exceed 5. More specifically, when two different kinds of monomers having $n_1$ and $n_2$, respectively, are used, $\Delta n = (n_1 - n_2)$ is preferably 1 to 5. In cases when three kinds of monomers having $n_1$, $n_2$ and $n_3$, respectively, are used, $\Delta n_1 = (n_1 - n_2)$, $\Delta n_2 = (n_2 - n_3)$ and $\Delta n_3 = (n_1 - n_3)$ each preferably is from 1 to 5. In cases when four or more kinds of monomers are used, each $\Delta n$ is also preferably from 1 to 5.

Combinations containing at least one acrylate monomer of the formula (I) wherein R represents a hydrogen atom are preferred to combinations selected among methacrylate monomers of the formula (I) wherein R represents a methyl group. Inter alia, combinations selected among acrylate monomers are more preferred. When a combination of monomers include a methacrylate monomer, there is noted a tendency, in some cases, that stable orientation would be difficult to obtain.

The photopolymerization initiators which can preferably be used in the present invention are those having at least one ethylenic linkage and at least one aromatic or heterocyclic aromatic ring in the molecule thereof. In particular, those represented by the following formulae (II) and (III) are preferably used.

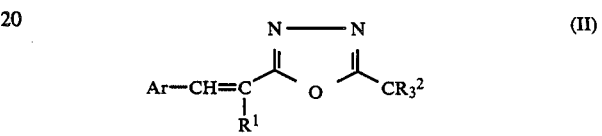

wherein Ar represents a substituted or unsubstituted aromatic ring or heterocyclic ring; R$^1$ represents a hydrogen atom, an alkyl group or an aryl group; and R$^2$ represents a chlorine atom or a bromine atom.

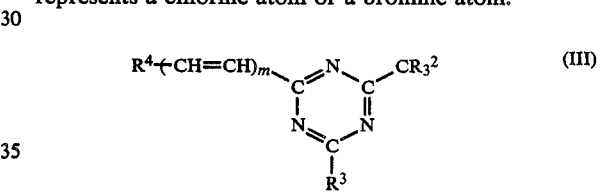

wherein R$^2$ is as defined above, R$^3$ represents —CR$^2{}_3$, —NH$_2$, —NHR$^5$, —NR$^5{}_2$ or —OR$^5$, wherein R$^2$ is as defined above, and R$^5$ represents a phenyl group or a lower alkyl group having not more than 11 carbon atoms; R$^4$ represents a substituted or unsubstituted aromatic ring or heterocyclic ring; and m represents 1, 2 or 3.

In the above-described formulae (II) and (III), the heterocyclic ring as represented by Ar or R$^3$ includes the following ones:

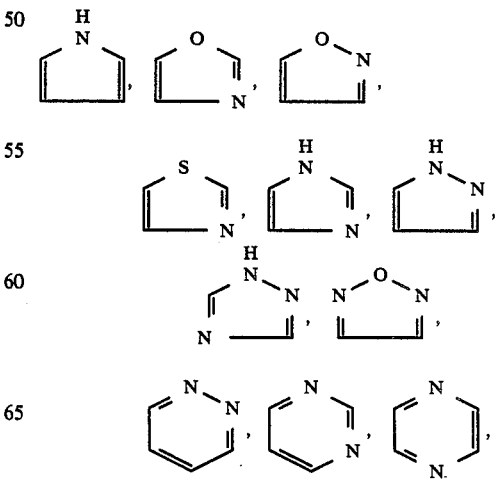

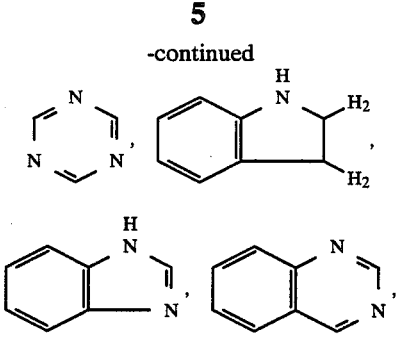
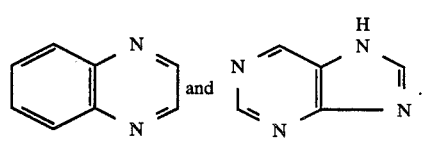
Specific examples of the compounds represented by the above-described formula (II) are described in Japanese patent application (OPI) No. 74728/79. The preferred among them are shown below:
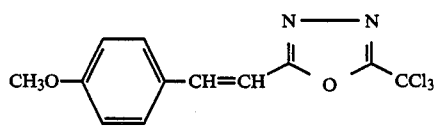 (1)
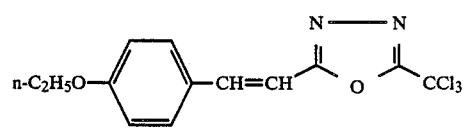 (2)
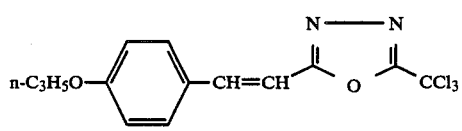 (3)
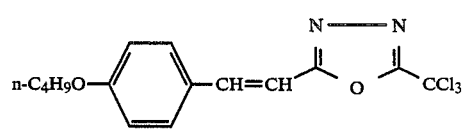 (4)
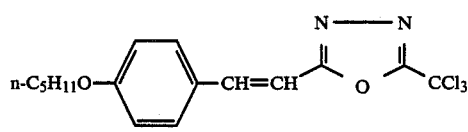 (5)
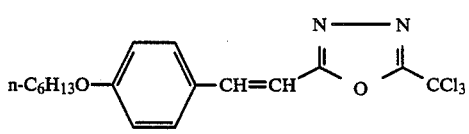 (6)
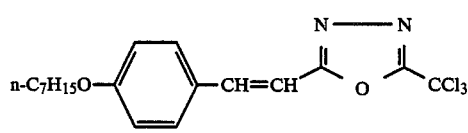 (7)
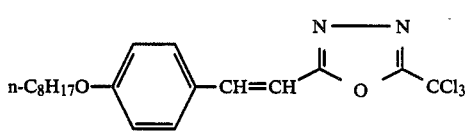 (8)
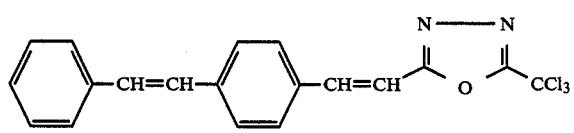 (9)
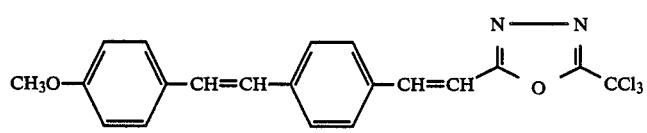 (10)
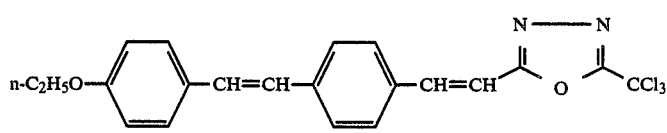 (11)
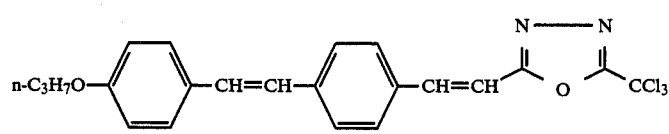 (12)
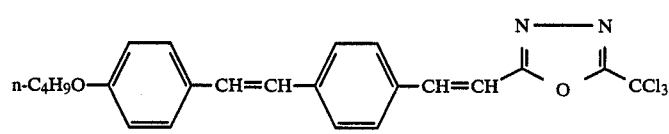 (13)
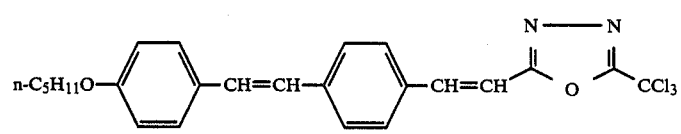 (14)

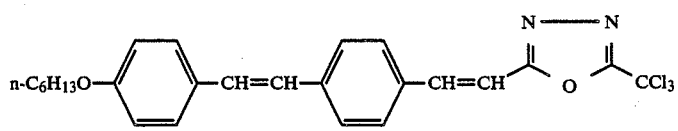(15)
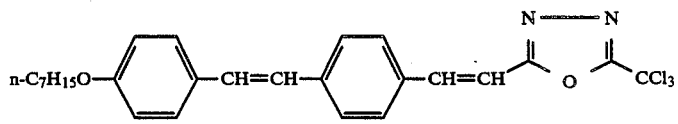(16)
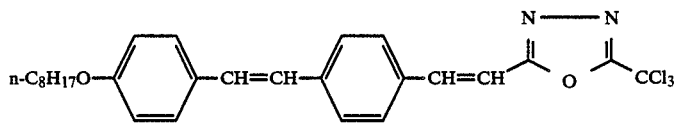(17)
Specific examples of the compounds represented by the formula (III) are shown below:
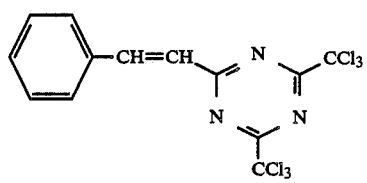(18)
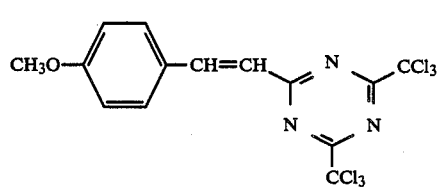(19)
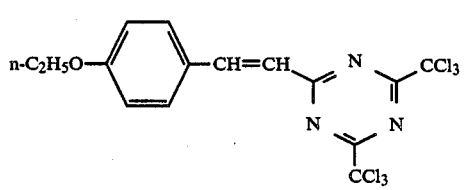(20)
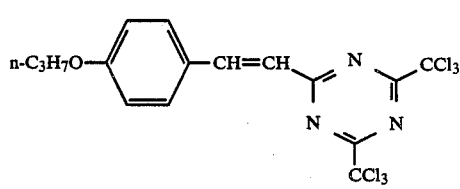(21)
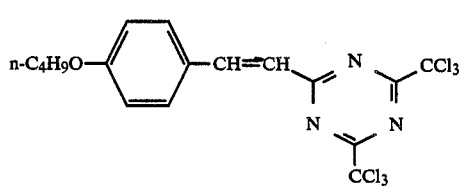(22)
-continued
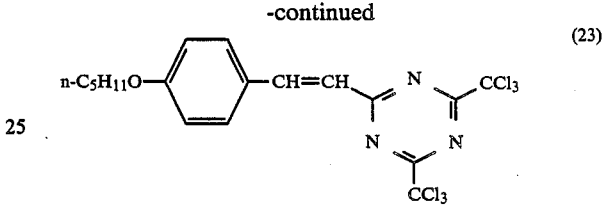(23)
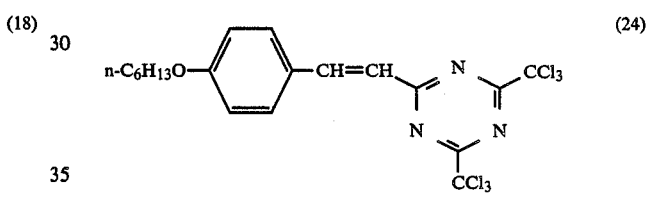(24)
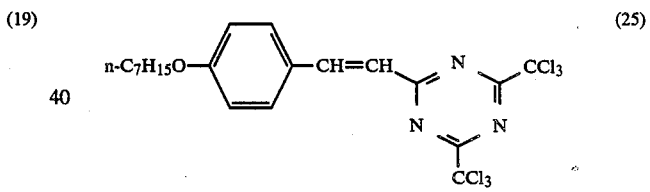(25)
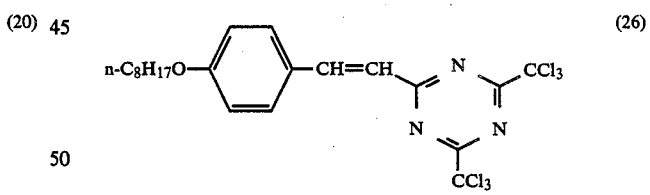(26)
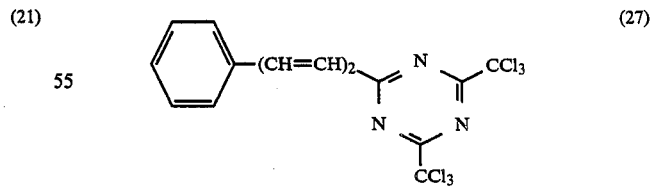(27)
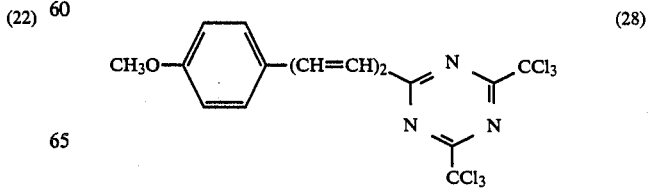(28)

-continued

(29) 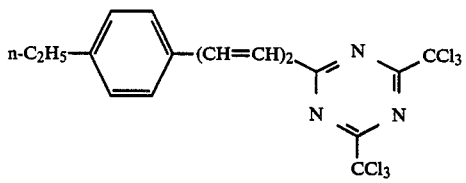

(30) 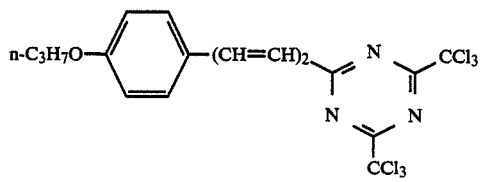

(31) 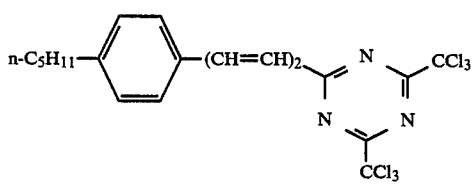

(32) 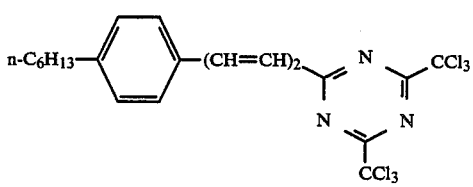

(33) 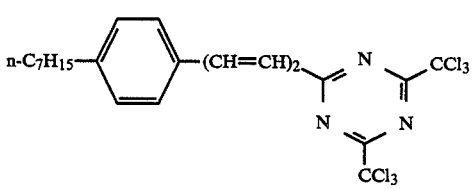

(34) 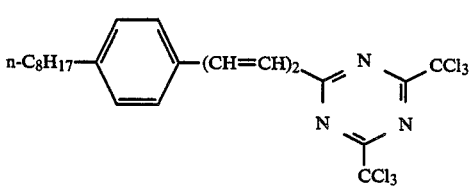

(35) 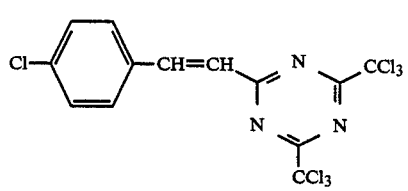

(36) 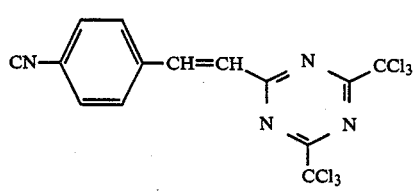

-continued

(37) 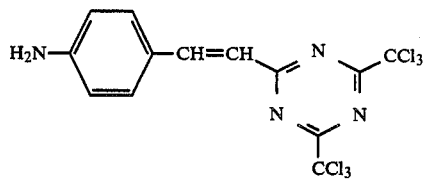

(38) 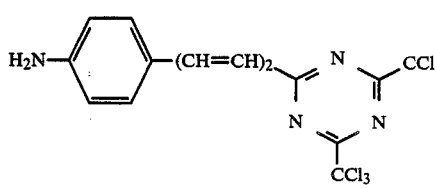

(39) 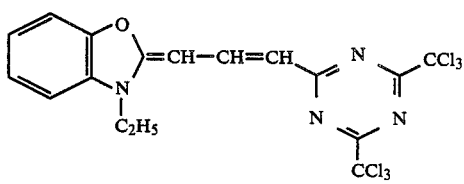

(40) 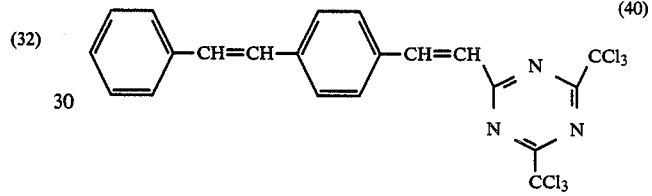

Use of these compounds having at least one ethylenic linkage and at least one aromatic or heterocyclic aromatic ring in the molecule thereof as a photopolymerization initiator makes it possible to carry out the polymerization to obtain a stable orientation state without narrowing the liquid crystal region of the liquid crystal monomers, thus greatly simplifying the film production step.

In addition to the above-described compounds, the photopolymerization initiators which may be used in the present invention further include:

(1) acetophenone and its derivatives, such as

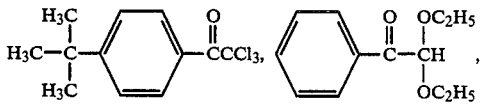

etc.;

(2) diphenyl ketone and its derivatives, such as

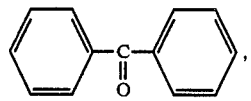

etc. (to be used in combination with $(CH_3)_2NCH_2CH_2OH$, etc.);

(3) benzoin and its derivatives, such as

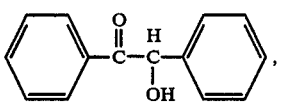

etc.;
(4) benzyl and its derivatives, such as

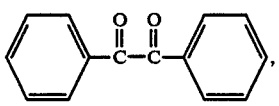

etc.;
(5) Michler's ketone and its derivatives, such as

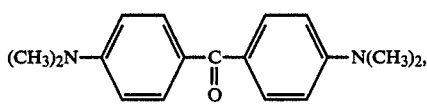

etc.;
(6) benzoin alkyl ethers, such as

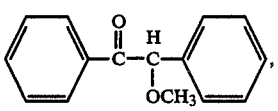

etc., and its derivatives, etc.;
(7) benzyl dimethyl ketal and its derivatives, such as

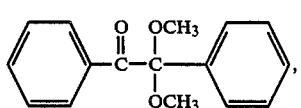

etc.;
(8) thioxanthone and its derivatives, such as

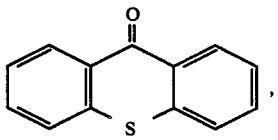

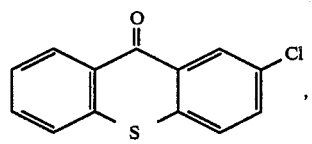

etc.;
(9) polyhalogen and its derivatives, such as

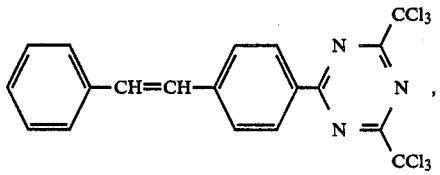

etc.; and the like.

The amount of the photopolymerization initiators to be added preferably ranges from 0.2 to 5% by weight based on the total amount of the liquid crystal monomers.

Supports which can be used in the present invention include glass and plastic sheets as well as belts or drums on one side of which a metal, e.g., stainless steel, chromium, aluminum, etc., is plated or vacuum deposited.

The plastic sheets which can be used include cellulose and its derivatives, such as cellulose, cellulose triacetate, cellulose diacetate, cellulose acetate butyrate, etc.; polyesters, such as polyethylene terephthalate, polyethylene naphthalete, etc.; polycarbonate; polyolefins, such as polypropylene, polyethylene, etc.; polyvinyl alcohol, polyvinyl chloride, polyvinylidene chloride, nylon, polystyrene, and the like.

The orientation of the supports can be carried out by rubbing the surface of the support with metals, natural fibers, e.g., cotton, wool, etc., synthetic fibers, e.g., nylon, polyester, acrylonitrile, etc.; or coating polyimide, polyamide, polyvinyl alcohol, etc., on the surface and then rubbing the coated surface with the above-described fibers, etc.; or coating an appropriate surface active agent on the surface.

The monomers can be maintained in a liquid crystal state by controlling the temperature of the atmosphere above the crystal of liquid crystal monomer⟷liquid crystal transition temperature (Tc) and below the liquid crystal⟷isotropic liquid transition temperature (Ti).

Radiation to be used for polymerization includes ultraviolet rays, visible light, etc., and the light sources thereof include a low pressure mercury lamp, a moderate pressure mercury lamp, a high pressure mercury lamp, an ultrahigh pressure mercury lamp, etc. In order to assure rapid progress of the polymerization, use of a high pressure or ultrahigh pressure mercury lamp is desirable.

If desired, the liquid crystal monomer composition according to the present invention may further contain additives other than the above-described photopolymerization initiator, such as dichromatic dyes, ultraviolet absorbents, low molecular liquid crystals, gapping agents, e.g., glass beads, etc., and the like as long as they do not impair liquid crystal properties of the monomers.

The dichromatic dyes which may be used include, for example, anthraquinone dyes and azo dyes which are usually employed as guests of guest-host liquid crystals.

The oriented films obtained by the process of this invention may be used as being supported on or between the support or supports or may be peeled away from the support after polymerization.

This invention will now be illustrated in greater detail with reference to the following examples, but it should be understood that they are not intended to limit the present invention. In these examples, birefringence of the resulting films was determined by measuring retardation by the use of a polarizing microscope equipped with a compensator using white light and dividing the measured value by the film thickness.

SYNTHESIS EXAMPLE (1) Synthesis of Liquid Crystal Monomer of Formula:

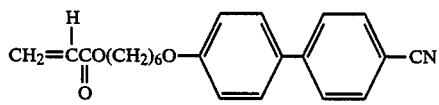

(hereinafter referred to as 6H):

To 800 ml of a methanol solution having dissolved therein 34 g (0.514 mol) of potassium hydroxide were added 100 g (0.512 mol) of 4-hydroxy-4'-cyanobiphenyl and 93 g (0.512 mol) of 6-bromo-1-hexanol, and the mixture was heated at reflux for 13 hours. The reaction mixture was poured into ice water and extracted with ethyl acetate. The extract was concentrated under reduced pressure by the use of an evaporator, and the residue was purified by column chromatography using Wakogel C-200 as a carrier and hexane/THF, i.e., tetrahydrofuran as a developing solution to obtain 65 g (yield: 40%) of 4-(6-hydroxyhexyloxy)-4'-cyanobiphenyl.

In 600 ml of tetrahydrofuran were dissolved 65 g (0.22 mol) of the resulting 4-(6-hydroxyhexyloxy)-4'-cyanobiphenyl and 31 g (0.31 mol) of triethylamine, and the solution was cooled to 5° C. To the cooled solution was added dropwise 24 g (0.26 mol) of acrylic acid chloride over a period of 30 minutes while stirring by a stirrer, followed by allowing the mixture to react at 5° to 10° C. for 1 hour. The reaction mixture was poured into ice water and extracted with ethyl acetate. The extract was concentrated to dryness, and the residual yellow solid was recrystallized twice from a mixed solvent of hexane and tetrahydrofuran to obtain 49 g (yield: 59%) of 4-[ω-(propenoyloxy)hexyloxy]-4'-cyanobiphenyl.

(2) In the same manner as described above, the following liquid crystal monomers were synthesized:

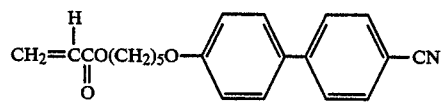

(hereinafter referred to as 5H)

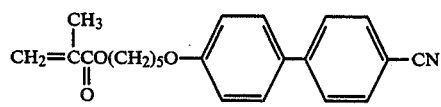

(hereinafter referred to as 5CH₃)

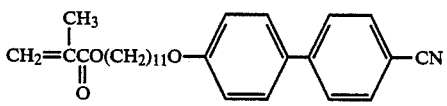

(hereinafter referred to as 11CH₃)

EXAMPLE

An orientating agent (PIX-1400-04, produced by Hitachi Chemical Co., Ltd.) was coated on glass plates with a spin coater, followed by heat treatment. The coated surface was rubbed with nylon cloth in a given direction.

A liquid crystal monomer mixture comprising 5H and 6H at a mixing ratio of 1:1 by weight having incorporated therein 1% by weight of a photopolymerization initiator of the formula:

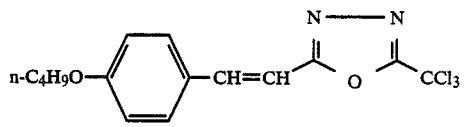

was supported between the above-treated glass plates so as to have a thickness of 50 μm. The resulting glass cell was once heated to 75° C. and then cooled. The glass cell was irradiated with light at 50° C. for 5 seconds using a 2 kw ultrahigh pressure mercury lamp to cause polymerization. After the polymerization, the glass plates were removed therefrom to obtain a uniform, transparent and soft oriented film having a birefringence value of 0.19.

COMPARATIVE EXAMPLE 1

Production of an oriented film was attempted according to the procedures as described in the above Example except for replacing the liquid crystal monomer mixture with a mixture comprising 5CH₃ and 11CH₃ at a mixing ratio of 1:1 by weight. When the glass cell was once heated to 75° C. and then cooled, a characteristic structure appeared in the smectic phase, proving that the attempt failed.

COMPARATIVE EXAMPLE 2

The same procedures as in the above Example were repeated except for replacing the liquid crystal monomer mixture with a compound of the following formula and heating the glass cell to 160° C. The resulting film was nonuniform having different birefringence values in different parts.

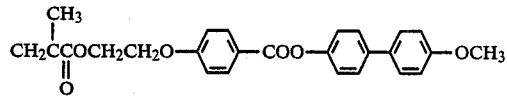

While the invention has been described in detail and with reference to specific embodiments thereof, it will be apparent to one skilled in the art that various changes and modifications can be made therein without departing from the spirit and scope thereof.

What is claimed is:

1. A process for producing an oriented film, which comprises supporting a composition comprising two or more liquid crystal monomers displaying a nematic or smectic state and having a polymerizable functional group in the molecule thereof and a photopolymerization initiator on or between a support or supports having been subjected to orientation, and irradiating said composition with radiation while maintaining said composition in a liquid crystal state to cause polymerization of said composition, wherein said two or more monomers are selected from acrylate and methacrylate monomers represented by the formula (I):

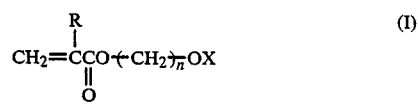

wherein R represents a hydrogen atom or a methyl group; n represents an integer of from 1 to 8 and 11; and X represents a para-substituted aromatic ring or a para-substituted heterocyclic ring, and wherein said photopolymerization initiator has at least one ethylenic linkage and at least one aromatic or heterocyclic aromatic ring in the molecule thereof.

2. A process as in claim 1, wherein X in the formula (I) is

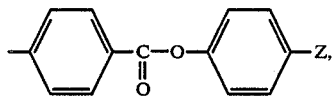

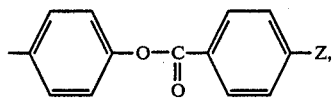

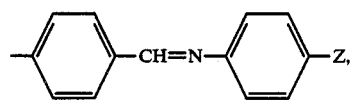

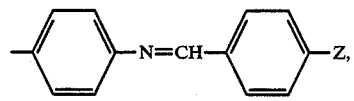

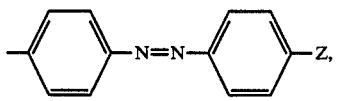

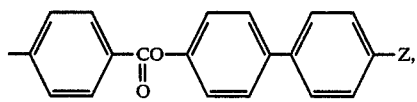

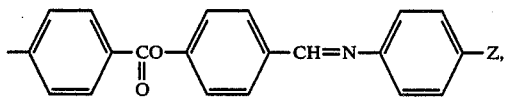

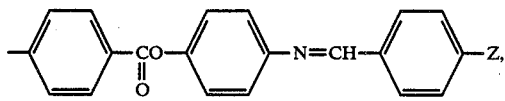

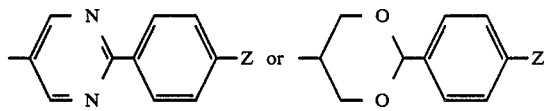

wherein Z represents a cyano group, a fluorine atom, a chlorine atom, a bromine atom, a methoxy group, an ethoxy group, a propoxy group, a butoxy group, a pentyloxy group, a hexyloxy group, a heptyloxy group, an amino group, a nitro group, —NHQ or —NQ$_2$, wherein Q represents a lower alkyl group having not more than 7 carbon atoms.

3. A process as in claim 1, wherein R in the formula is a hydrogen atom.

4. A process as in claim 1, wherein said two or more monomers are selected so that a difference of the value n in the formula (I) between each pair of monomers does not exceed 5.

5. A process as in claim 1, wherein said photopolymerization initiator is represented by the formula (II) or (III):

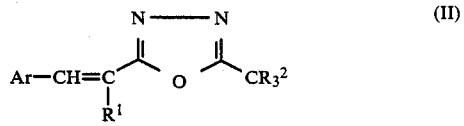

wherein Ar represents a substituted or unsubstituted aromatic ring or heterocyclic ring; R$^1$ represents a hydrogen atom, an alkyl group or an aryl group; and R$^2$ represents a chlorine atom or a bromine atom,

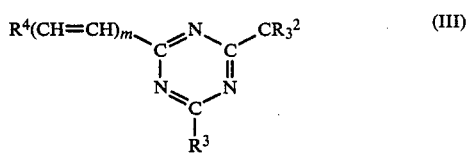

wherein R$^2$ is as defined above; R$^3$ represents —CR$^2_3$, —NH$_2$, —NHR$^5$, —NR$^5$ or —OR$^5$, represents a phenyl group or a lower alkyl group having not more than 11 carbon atoms; R$^4$ represents a substituted or unsubstituted aromatic ring or heterocyclic ring; and m represents 1, 2 or 3.

6. A process as in claim 1, wherein said photopolymerization initiator is present in an amount of from 0.2 to 5% by weight based on the total amount of the monomers.

7. A process as in claim 1, wherein said radiation includes ultraviolet rays, electron rays or visible light.

8. A process for producing an oriented film as in claim 1, which comprises supporting a composition consisting essentially of two or more liquid crystal monomers displaying a nematic or smectic state and having a polymerizable functional group in the molecule thereof and a photopolymerization initiator on or between an support or supports having been subjected to orientation, and irradiating said composition with radiation while maintaining said composition in a liquid crystal state to cause polymerization of said composition.

* * * * *